Dec. 9, 1924.  
M. A. BARBER  
AUTOMATIC TRAIN PIPE CONNECTER  
Filed Nov. 17, 1921  
1,518,380  
3 Sheets-Sheet 2
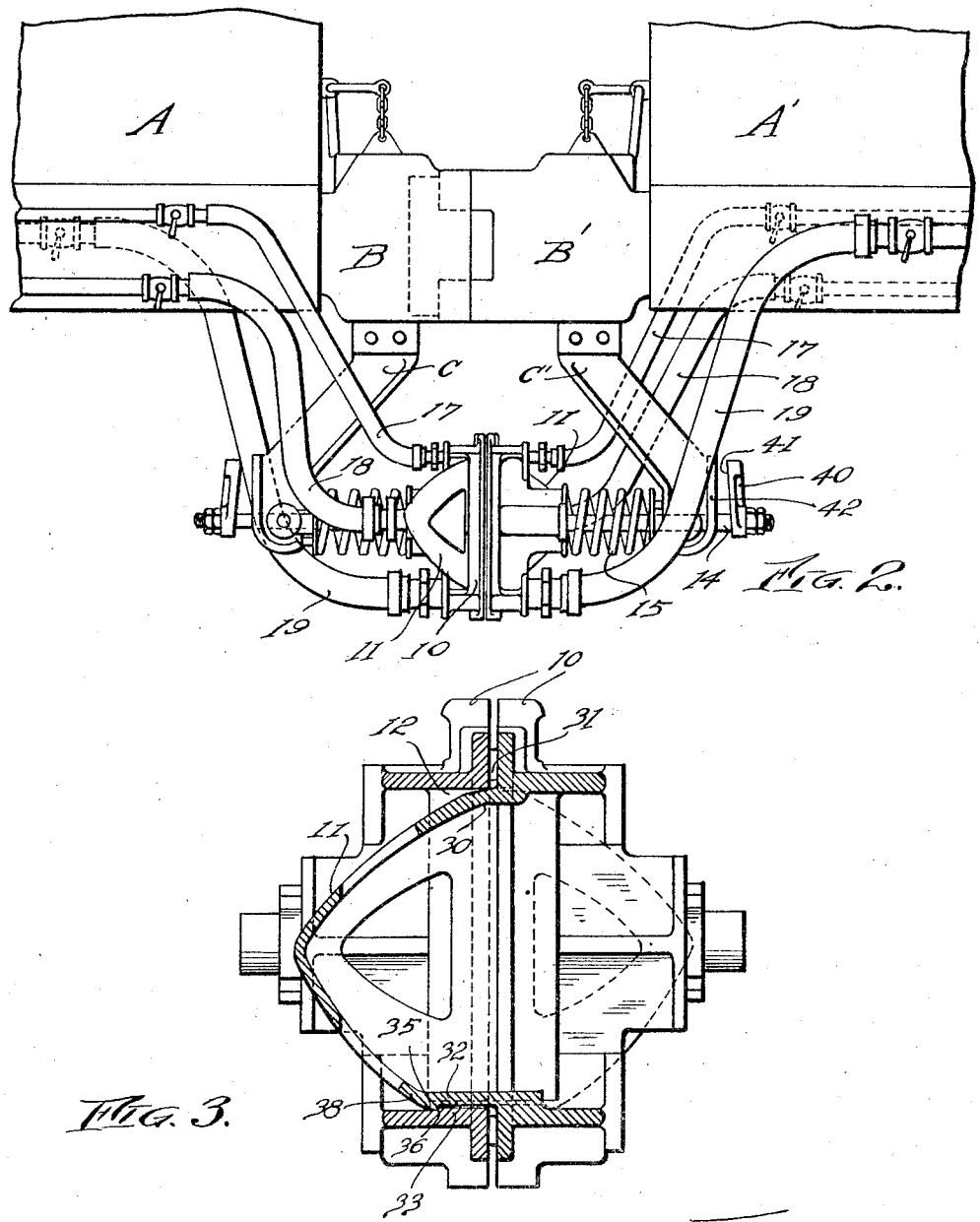

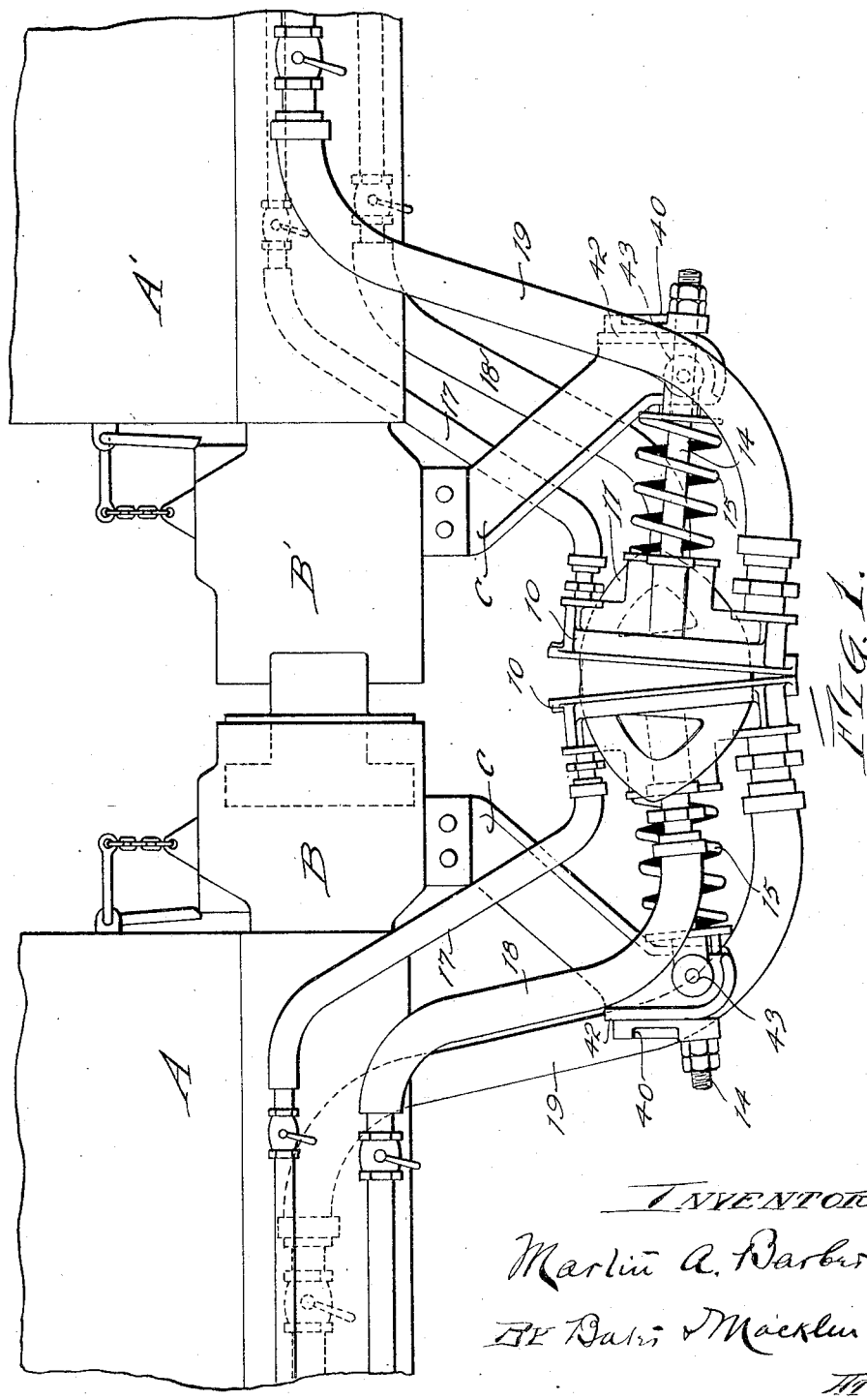

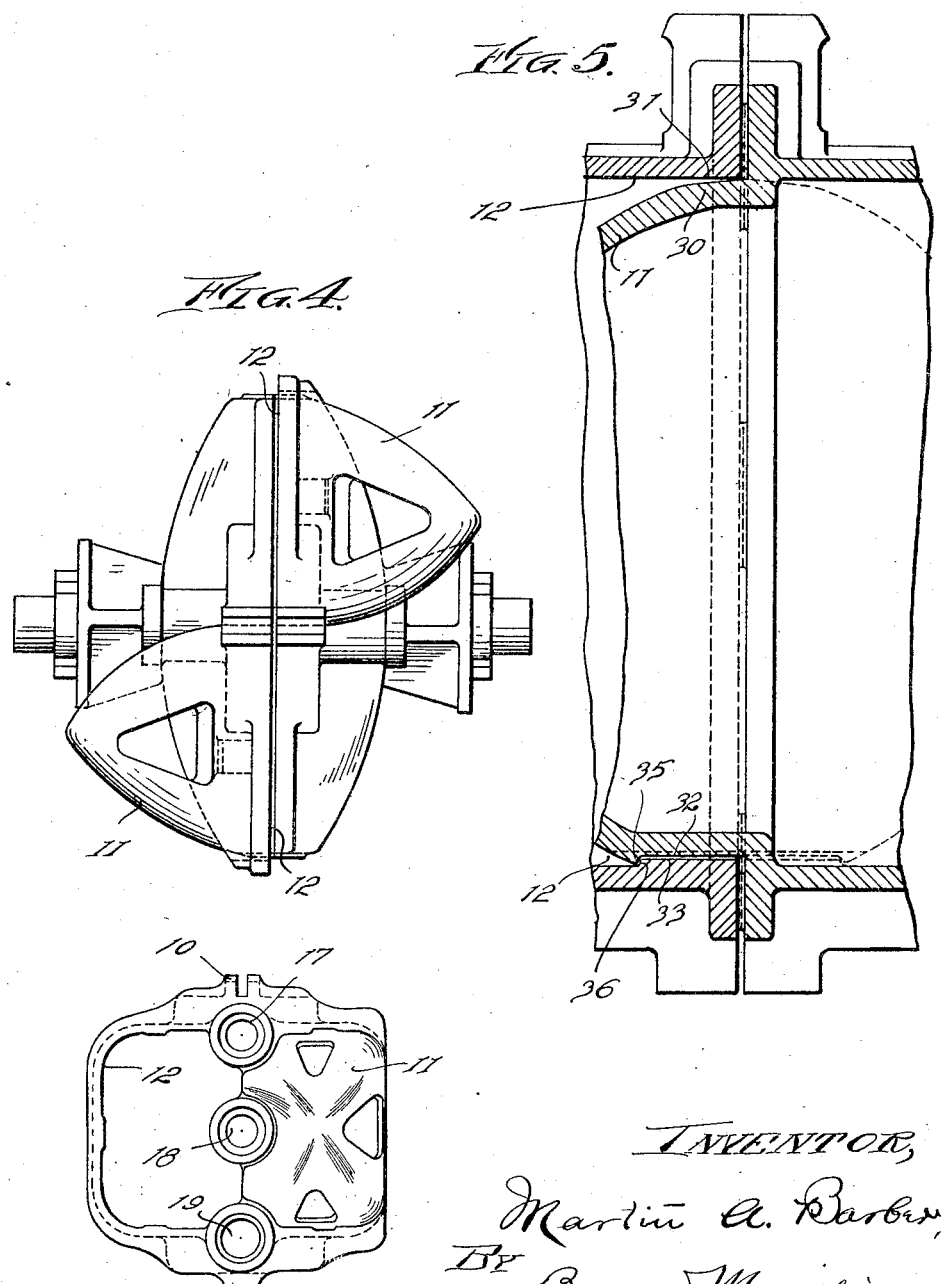

Patented Dec. 9, 1924.

1,518,380

UNITED STATES PATENT OFFICE.

MARTIN A. BARBER, OF CLEVELAND, OHIO, ASSIGNOR TO THE AMERICAN AUTOMATIC CONNECTOR COMPANY, OF WYOMING, DELAWARE, A CORPORATION OF DELAWARE.

AUTOMATIC TRAIN-PIPE CONNECTER.

Application filed November 17, 1921. Serial No. 515,803.

*To all whom it may concern:*

Be it known that I, MARTIN A. BARBER, a citizen of the United States, residing at Cleveland, in the county of Cuyahoga and State of Ohio, have invented a certain new and useful Improvement in Automatic Train-Pipe Connecters, of which the following is a full, clear, and exact description, reference being had to the accompanying drawings.

My invention relates to automatic train pipe connecters and more particularly to means for preventing the gapping or partial separation of connected coupler heads and the consequent leakage of fluid therefrom due to abnormal pressure in one of the pipes.

My improved coupler head construction is shown incorporated with a form of automatic connecter having a spring-pressed coupler head supported by the draw bar of a train coupler, and provided on one side with a projection and on the other with a recess. Such a connecter which has been demonstrated to be efficient is shown for instance in Patent No. 1,161,403 granted November 3, 1915 to A. L. Moler and his assignees. However, the present invention is applicable to connecters of other types and is not limited to use in the particular coupler head illustrated.

In the use of automatic connecters, for example of the type illustrated, the air signal pipe, air brake pipe, and the steam pipe are arranged in vertical order with a normal pressure in the latter of about 45 pounds. Occasionally, however, due to failure of a reducing valve, steam under boiler pressure of 200 pounds or thereabouts may occupy the steam pipe. This abnormal pressure tends to separate the connected coupler heads and cause them to gap to a slight extent adjacent to the ends of the abutting steam pipes and thereafter keep them in this condition; thereby permitting the steam and also the air to escape through the resultant gap formed between the ends of the connected pipes.

The present invention is designed to prevent the occurrence of this condition and has for its object the provision of a coupler head having means adapted to coact with means on the meeting head to prevent the heads being forced apart by an excessive pressure. More specifically, it is an object of my invention to so shape the walls of each projection and its mating recess in the coupler heads, that abnormal steam pressure in the steam pipe when the heads are coupled, will simply insure a tighter locking together of the heads, thus preventing their gapping open, yet in no way interfering with the normal separation of the heads upon release of the train coupler. Another feature of the invention is the provision of a very simple device on the shank of the connecter for automatically tipping the head upwardly as the coupled connecters separate, so that the locking shoulders on the projections and recesses become automatically freed from each other and they separate without wearing contact.

My invention is hereinafter more fully explained in connection with the accompanying drawings and the essential characteristics are summarized in the claims.

In the drawings, Fig. 1 is a side elevation of my automatic connecters on the adjacent ends of two cars in the act of being coupled or uncoupled; Fig. 2 is also a side elevation of the connecters, but showing their relative position when the cars are coupled; Fig. 3 is a longitudinal vertical section through the coupler heads; Fig. 4 is a plan of the connected coupler heads; Fig. 5 is an enlarged fragmentary view showing more in detail the improved coupler head construction constituting part of my invention. Fig. 6 is a front elevation showing the position of the various conduits on the connecter heads.

In the various figures, A and A' indicate two railway cars, B, the couplers thereof, while C represents brackets depending from the couplers and carrying the automatic connecters to which the train pipes lead. The automatic connecter shown, has a head 10, with orifices for train pipes, and a projection 11 on one side thereof, and a recess 12 on the other side, for receiving the corresponding projection on another head. The head as shown is provided with a shank 14 which has a sliding and universally movable connection with the bracket C depending from the train coupler. A strong compression spring 15 surrounding the shank, presses the head longitudinally; the spring being compressed while the heads are coupled. The connecter is shown as having three orifices which are respectively arranged for receiving the air signal pipe 17, the air brake conduit 18, and the steam pipe 19.

The construction described in the above paragraph is substantially described in the patent heretofore referred to, and indicates a type of connecter to which I have applied my locking features with great success. It should be understood however, that the present invention is not limited to that particular connecter.

My improved construction comprises in part, coacting shoulders on the lower walls of the projections and recesses of the coupler heads to provide the lock, above referred to, to prevent the accidental separation of the heads. To this end, the lower wall surfaces 32 and 33 of the projections 11 and recesses 12 are shown as terminating respectively in a lock rib 35 and shoulder 36.

I construct the lower coacting portions of the walls of the projections and recesses adjacent to the abutting faces of the coupling heads with relatively long engaging surfaces 32 and 33 leading to the locking shoulders, while the upper engaging surfaces 30 and 31 are comparatively short. Beyond the surfaces 30, 31, 32 and 33, the walls of the projections 11 and recesses 12 converge in the same pyramidal way as in the patent above referred to. Means hereinafter described tips the upper edge of the heads apart as they are being separated, thus raising the shoulders 35 to clear the surfaces 33, and the amount of this raising is materially increased by lengthening the radius about which the shoulders swing, that is, the portion 32 of the bottom wall of the projection.

The forward or outer edge of the locking rib 35 has an inclined face 38 of less steepness than the rear or inner face which latter corresponds in slope to the shoulder 36 which consists of a shallow depression adapted to be occupied by the blunt hook-like rib 35. The coupler projection is slightly smaller than the recess into which it extends, to enable it to move freely into and out of position. This difference in size however, is not sufficient to permit the rib 35 to slide freely over the shoulder 36 except when the heads are tipped apart as referred to, and as illustrated in Fig. 1.

To effect the tipping of the heads during separation, and to hold them in such position when uncoupled, by means which shall be simple and certain and automatic in action, I provide the wing 40 which is adjustably secured at the end of the shank 14 and is formed with a forwardly inclined surface 41 which on engagement with the rear surface 42 of the bracket C, throws the head 10 upwardly about the pivotal point 43. This places the connecters in the position indicated to a somewhat exaggerated extent in Fig. 1. This action occurs positively at the completion of the uncoupling of the connecters, because after the car couplers are mutually released the springs 15 continue to press the connecter heads together as the cars separate, until the rear edges of the brackets abut the top portions of the forwardly inclined wings 40. The forcing of these wings into the vertical planes shown in Fig. 1 tips the shanks and heads so that the ribs 35 are raised until they clear the shoulders 36. Thus frictional engagement between the shoulder and surfaces 33 during coupling and uncoupling is avoided. By adjusting the wing 40 so as to cause its engagement with the bracket surface 42 just prior to the final uncoupling movement of the connecters, and by proportioning the surface 30 with relation to the surface 31 as shown, the connecters may be coupled freely and easily and without wear on the lock, and yet, when together, the coupled heads hold their mutual position notwithstanding excessive pressure in the steam pipe.

The action of an abnormal pressure in the steam pipe as above explained, tends to pivot the connected heads about a point adjacent the top thereof, so as to swing the lower ends apart. Obviously, if the projection 11 could fit snugly within the recess 12, the tendency of the heads to spread might be overcome by lengthening the surfaces 32 and 33, and maintaining them parallel to each other. But in practice the two heads frequently do not strictly register with each other when presented, so that considerable play is necessary. I find I can provide the desired loose play and also an effective lock by the arrangement of cooperating surfaces and interlocking shoulders illustrated in the drawings.

An important characteristic of construction is embodied in the position of the latch with relation to the axis of the steam conduit, the conduit being below the plane of the latch. Accordingly, when there is excessive pressure in the steam conduit, the tendency of such pressure is to force the heads apart by pivoting them about the top thereof. This action however, is restrained by the latch which is embodied in the rib 35 and shoulder 36. If the steam conduit were positioned above the latch, however, then excessive pressure in the conduit would tend to pivot the heads about the bottom thereof and thereby enable steam and air to escape quite readily.

By so constructing the projection 11 with relation to the recess 12 that a snug fit is obtained when the connecter heads are in coupled position, then it will be evident that the projecting rib constituting a part of the latch prevents the coupling action while the connecter heads are in substantially horizontal position. It will also be evident that by making the latch adjacent the bottom face of the projection and recess, there is little opportunity for snow to pack behind the latch and thereby prevent the accurate engagement of the connecter heads.

In use, when the car couplers B become automatically coupled by the cars A and A¹ being brought together end to end, the connecter heads 10 also become coupled by reason of the fact that the projection 11 and recess 12 on one head coact with the opposite elements on the other. While the cars are moving toward each other, the connecter heads are slightly elevated as shown in Fig. 1 by reason of the engagement between the wing 40 and bracket surface 42. As soon as contact is made between the lower ends of the heads, then further movement of the cars toward the coupled position compresses the springs 15, and thereafter swings the top of the heads together, and simultaneously moves the wings 40 away from the brackets. While this movement is occurring, the rib 35 which is normally above the shoulder 36 is gradually moving inwardly and downwardly so that when the heads are finally connected, the rib is below the shoulder as indicated in Figs 3 and 5.

When it is desired to uncouple the cars the couplers B are released and as the cars separate, and the wings 40 advance into engagement with the surfaces 42 on the brackets C, whereupon further uncoupling movement of the cars causes the connecter heads to rise and tip apart thereby freeing the locking shoulders. This tilting action results before the rib can be drawn over the coacting shoulder, and consequently there is no mutual wear of such parts.

From the foregoing description, it will be apparent that I have provided a very simple, yet highly efficient, practical and durable automatic locking action between automatic coupler heads which will prevent accidental separation of such heads under abnormal circumstances as above outlined, without in the least interfering with the normal coupling or uncoupling operation. It will be further apparent that my lock does not add to the number of parts or materially increase the cost of the connecter.

Having thus described my invention, I claim:—

1. In a device of the class described, the combination with a coupling head, of a bracket support therefor, means associated with the support for automatically tilting said head out of its normal coupled position, and a lock released by such tilting action.

2. In a device of the class described, the combination with a pair of coupling heads, of means for holding said heads yieldingly together, a bracket support for each head, and means associated with the support for automatically tilting said heads while they are being drawn apart, said heads having interlocking shoulders freed by such tilting action.

3. In a device of the class described, the combination with a bracket, of a coupling head, means carried by the bracket for pressing said head yieldingly forward, means actuated by uncoupling movement of the head and co-operating with the bracket for automatically tilting the head, and a lock freed by such tilting.

4. In combination, two railway cars equipped with automatic couplers, a support rigidly secured to each of said couplers, a connecter head carried by each support, means for yieldingly urging said heads forwardly of the car, means for normally holding said heads in engagement with each other, while the cars are coupled, and other means actuated by contact with the support during the uncoupling operation for tilting the heads, and interlocking shoulders on the two heads freed by such tilting movement.

5. In a device of the character described, the combination with a support, of a coupling head carried thereby, means for pressing said head yieldingly forward, a forwardly projecting latch carried by said head, a corresponding head having a socket associated therewith to receive the first mentioned head, said socket being adapted to receive said latch, whereby said heads are secured together when in coupled position, and means adapted to engage the support for tilting the heads and freeing the latch while the heads are being uncoupled.

6. In an automatic train pipe connecter, the combination of coacting coupler heads having engaging surfaces materially below the axis thereof which prevent acting forces below the axis from separating them, and means comprising coacting surfaces at the rear of the heads for tilting them during the separating movement, and locking shoulders on said head released by such tilting.

7. In combination, a coupling head having a projection and a recess located side by side, the engaging surfaces of said projection and recess having interlocking shoulders adjacent the meeting plane of the heads, and means associated with said heads for tilting said projections to free said shoulders.

8. In combination, coupling heads, each having a projection adapted to engage a recess in the other, relatively small contacting surfaces between said projection and recesses at one side, relatively large contacting surfaces between said elements at an opposite side, and means for tilting one of said heads relatively to the other, whereby said heads when coupled may be readily disengaged.

9. A train pipe connecter, comprising coupler heads, one having a projection and the other a recess, said recess having walls adapted to engage closely the base of the projection, one of said walls having a shoulder to coact with the corresponding portion at the base of said projection, and interengaging surfaces connected with the coupler head and its support respectively for disengaging the coacting portions.

10. A train pipe connecter, comprising coupler heads, a support for each head, one of said heads having a pyramidal projection and the other a recess having walls adapted to engage closely the base of the projection, there being a rib on said base and a shoulder on one of said walls to co-operate with said rib, and means operable upon the forward movement of the head relatively to the support for disengaging said rib and shoulder.

11. A train pipe connecter comprising two coupler heads, one of said heads having a pyramidal-shaped projection, and the other having a recess adapted to receive said projection, the lower face of said projection being of a different contour from the other faces and including a relatively large horizontal area adapted to have free co-operation with the adjacent wall of the recess during a normal coupling and uncoupling movement but tending to bind thereagainst when a force tending to separate said heads is applied non-axially adjacent to said areas, and co-operating members for causing the free sliding engagement between the projection and recess.

12. A train pipe connecter, comprising two coupler heads, one having a pyramidal-shaped projection and the other a recess adapted to embrace the projection, the base of the upper side of the projection adjacent to the face of the coupler head having a comparatively narrow portion, and the lower side of said projection having a relatively wide portion adapted to fit the interior horizontal bottom wall of the recess, and means comprising co-operating cam surfaces for enabling the normal coupling and uncoupling to be readily accomplished by transmission of force axially of the coupler heads.

13. In combination, a support, a connecter head yieldingly mounted thereon, a member associated with the head and adapted to engage said support, one of said engaging surfaces being inclined to the vertical, whereby the head is tilted when said surfaces are brought into contact with each other, and a lock on the head released by such tilting.

14. In combination, a pair of connecter heads, each head having a projection and recess positioned side by side, the projection on one head being adapted to engage the recess in another, a latch comprising a protruding portion on one of said heads, said latch preventing the coupling of said heads while the heads are in substantially horizontal position.

15. The combination with a pair of connecter heads each having a recess and a projection positioned side by side, the projection of one head being adapted to engage a corresponding recess in the other, a latch adjacent the bottom faces of said heads, said latch preventing the normal coupling action while the heads are in substantially horizontal position, and cam actuated means for tilting said heads to permit them to be coupled.

16. In an automatic train pipe connecter, the combination of coacting coupler heads each having a projection thereon, and having engaging surfaces below the axis of the heads, means to prevent substantially horizontal forces acting below the axis from separating the coupler heads, said means comprising a cam surface on the lower side of each projection.

17. A coupler head having a projection and a recess located side by side and having three train pipe orifices in a vertical row between the same, the engaging surfaces of said projection and the corresponding recess on a mating head having interlocking shoulders and means associated with said heads for tilting said projections to free said shoulders.

18. A coupling head having a projection at one side thereof, the upper and lower faces of said projection being of different contour, and the projection having substantially horizontal portions of which the lower is materially larger than the upper.

19. In combination, coupling heads each having a projection adapted to engage a recess in the other, relatively small contacting surfaces between said projections and recesses at one side, relatively large contacting surfaces between said elements at another side and means comprising a relatively stationary and a relatively movable abutment for tilting one of said heads relatively to the other, whereby said heads when coupled may be readily disengaged.

20. A train pipe connecter having coupler heads with abutting transverse bases, train pipe orifices within said faces, one of said orifices being for the air brake pipe and the other for the steam pipe, a projection from each face at one side of the orifices, said faces having recesses coacting with said projections, the contour of the lower faces of the projections differing from that of the other faces and including a horizontal surface adapted to slide freely over the adjacent wall of the corresponding recess, during normal coupling and uncoupling of the heads and cooperating shoulders on the coacting projection and recesses adapted to prevent uncoupling when steam under pressure tends to separate the coupler heads.

21. In a train pipe connecter, comprising coupler heads having a substantially axially abutting air brake pipe, a pyramidal projection in one head adapted to cooperate with a corresponding recess in the other, the lower face of said projection having a substantially flat surface adapted to slide freely over the corresponding surface in the interior of the recess during normal coupling and uncoupling but adapted to bind when steam under excessive pressure in the steam pipe tends to separate the coupling heads and a transverse rib on the lower surface of the projection cooperating with a transverse shoulder in the adjacent wall of the recess, said rib being located substantially at the junction of the forward edge of the horizontal and inclined portions of the lower face of the projection.

22. A pair of mating coupler heads, each having a projection and a recess side by side and each having horizontal portions and between the projection and recess a vertical row of three orifices and cooperating shoulders on one of the horizontal portions of the projection and recess adjacent the meeting faces of the heads preventing uncoupling by reason of an excessive pressure in the pipe communicating with the orifice adjacent to said horizontal portion.

In testimony whereof, I hereunto affix my signature.

MARTIN A. BARBER.